United States Patent
Ahles et al.

(10) Patent No.: US 7,503,486 B2
(45) Date of Patent: Mar. 17, 2009

(54) SYSTEMS AND METHODS FOR PROCESSING CHECK IDENTIFIERS USING REPLACEMENT SYMBOLS

(75) Inventors: Daniel R. Ahles, Houston, TX (US); Paul D. Dauben, Houston, TX (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 11/747,056

(22) Filed: May 10, 2007

(65) Prior Publication Data

US 2007/0205265 A1 Sep. 6, 2007

Related U.S. Application Data

(62) Division of application No. 10/041,714, filed on Jan. 8, 2002.

(51) Int. Cl.
*G06K 5/00* (2006.01)
*G06K 15/00* (2006.01)
(52) U.S. Cl. ............... 235/380; 235/379; 235/375; 235/381; 235/383; 705/45; 705/75; 705/80
(58) Field of Classification Search ........... 235/379, 235/380, 375, 381, 383; 705/45, 75, 80
See application file for complete search history.

(56) References Cited

U.S. PATENT DOCUMENTS

| | | | | |
|---|---|---|---|---|
| 5,175,682 A | | 12/1992 | Higashiyama et al. | |
| 5,432,506 A | * | 7/1995 | Chapman | 705/44 |
| 5,444,616 A | | 8/1995 | Nair et al. | |
| 5,679,940 A | * | 10/1997 | Templeton et al. | 235/380 |
| 5,717,868 A | * | 2/1998 | James | 705/35 |
| 5,783,808 A | * | 7/1998 | Josephson | 235/379 |
| 5,890,141 A | * | 3/1999 | Carney et al. | 705/45 |
| 6,021,202 A | * | 2/2000 | Anderson et al. | 705/54 |
| 6,097,834 A | | 8/2000 | Krouse et al. | |
| 6,301,379 B1 | * | 10/2001 | Thompson et al. | 382/137 |
| 6,464,134 B1 | | 10/2002 | Page | |
| 6,796,488 B1 | * | 9/2004 | Saffarian | 235/379 |
| 7,181,430 B1 | * | 2/2007 | Buchanan et al. | 705/45 |
| 2001/0034632 A1 | | 10/2001 | Knight et al. | |
| 2002/0040344 A1 | * | 4/2002 | Preiser et al. | 705/42 |

(Continued)

OTHER PUBLICATIONS

Disclosure Under § 1.56 filed Jul. 30, 2008.

(Continued)

*Primary Examiner*—Le Thien Minh
*Assistant Examiner*—Tuyen K Vo
(74) *Attorney, Agent, or Firm*—Sutherland Asbill & Brennan LLP (57) ABSTRACT

An original check identifier in MICR format includes separator symbols that do not appear on a typical computer keyboard. When a user is entering a check identifier from a computer or a telephone, the user is instructed to replace the separator symbols with replacement symbols that appear on a typical computer keyboard. The replacement symbols indicate the separation of fields within the check identifier, such as the routing number field, the account number field and the check number field. The entered check identifier with replacement symbols is parsed to distinguish the fields. After the fields are distinguished, the routing number, the account number and the check number of the check identifier are identified.

20 Claims, 7 Drawing Sheets

U.S. PATENT DOCUMENTS

2002/0120846 A1* 8/2002 Stewart et al. .............. 713/168
2002/0161707 A1 10/2002 Cole et al.
2003/0105710 A1 6/2003 Barbara et al.

OTHER PUBLICATIONS

Disclosure Under 37 CFR 1.56 dated Oct. 30, 2008, filed for U.S. Appl. No. 11/747,056.

* cited by examiner

SYSTEMS AND METHODS FOR PROCESSING CHECK IDENTIFIERS USING REPLACEMENT SYMBOLS

This application is a divisional of U.S. application Ser. No. 10/041,714, filed on Jan. 8, 2002, the entirety of which is hereby incorporated herein by reference.

BACKGROUND OF THE INVENTION

1. Field of the Invention

The invention relates to the field of electronically processing financial transactions, and more particularly to the systems and methods of processing check identifiers.

2. Description of the Related Art

Many customers make purchases from a computer or telephone. For example, customers select items at a web site, talk to a live telephone operator, or use automated menu entry from a telephone. Although credits cards and, in some occasions debit cards, can be used to make purchases from a computer or telephone, customers often prefer to use checks. For example, in many instances, using debit cards requires the merchants to maintain real-time communication links with the debit card banks. Since customers may use a wide variety of banks, merchants typically establish and maintain communication links with a large number of banks.

Using credit cards, on the other hand, can reduce the merchant's profit margin, because the merchant pays a percentage of the sales to the credit card company. In addition, some customers are concerned with the potential theft of credit card information. Some customers are also concerned with the monthly fees charged on credit cards with outstanding balances.

It is therefore desirable for merchants to allow customers to use checks to make purchases. In order to identify a check from a computer or telephone, customers enter a check identifier by typing on a computer keyboard or hitting the keys of a touch-tone telephone, or speak the check identifier to a telephone operator who enters the check identifier into a computer. A check identifier is typically printed on a paper check. In one example, a check identifier is the check identification data located in the Magnetic Ink Character Recognition (MICR) line printed on a paper check.

In a typical MICR line, the check identifier includes multiple fields such as the routing number field, the account number field, and the check number field. These fields are separated by separator symbols. The separator symbols are unique and typically do not correspond to regular symbols that appear on a computer keyboard. However, if the separator symbols are omitted and a check identifier is entered into a computer without any symbols, it becomes difficult to distinguish the different fields.

SUMMARY OF THE INVENTION

Inventive methods and systems for processing check identifiers are described that enhance the processing of check identifiers. In one embodiment, generic symbols are substituted for the unique symbols in a check identifier. The generic symbols are then processed to identify information in the check identifiers.

For example, in one embodiment, a user enters the MICR line associated with a check transaction. Where unique symbols appear in the MICR line, the user enters replacement symbols that appear on common computer keyboards or common touch-tone telephones. The fields commonly located within the entered check identifier, such as the routing number field, the account number field and the check number field can be separated by the replacement symbols. The entered check identifier with the replacement symbols is parsed and the routing number field, the account number field, and the check number field are identified.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

The following section describes embodiments of systems and methods that attempts to ensure the correct entry of check identifiers. When a user enters a check identifier that does not relate to a stored record in a database, the user is asked to enter the check identifier again. The entered check identifier is accepted if the second entry is consistent with the first entry.

The following section also describes other embodiments of systems and methods for entering and receiving check identifiers. A user is instructed to replace the separator symbols in an original MICR format check identifier with replacement symbols. The replacement symbols are used to distinguish the various fields within the check identifier.

In the present application, a customer refers to a person or entity that attempts to complete a financial transaction using a check. A check refers to a negotiable instrument recognized by financial institutions. A check identifier refers to a string of symbols that identifies a check. A check identifier in MICR format refers to a check identifier including a routing number, an account number, and a check number. An original check identifier refers to a check identifier in a MICR format including one or more separator symbols as printed on a paper check.

A user entering a check identifier refers to the user entering a check identifier by techniques other than scanning the paper check on which the check identifier is printed. For example, the user can enter the check identifier by typing on a computer keyboard, hitting the keys on a touch-tone telephone, or speaking into a telephone system that accepts human voice input. A user refers to a customer or an operator employed by a merchant or a check processor.

A module refers to implementation of program logic. The module may advantageously be configured to execute on one or more processors. The module can include, but is not limited to, software or hardware components such as software object-oriented software components, class components and task components, processes methods, functions, attributes, procedures, subroutines, segments of program code, drivers, firmware, microcode, circuitry, data, databases, data structures, tables, arrays, and variables. A module can also refer to a set of business rules not embodied in a computer program.

Overview

Figure 1:
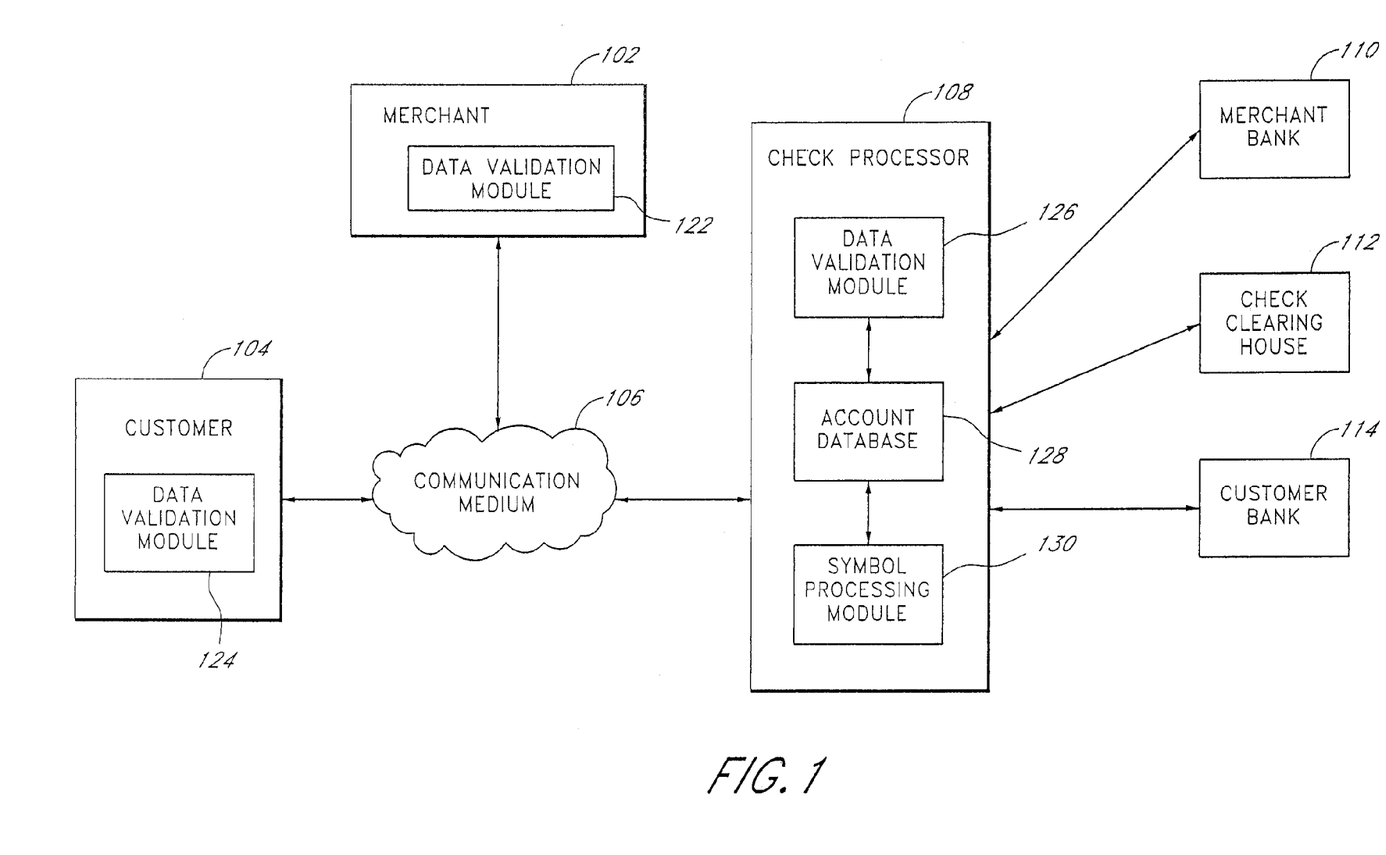
FIG. 1 shows one embodiment of a system including a merchant, a customer, and a check processor.

FIG. 1 shows one embodiment of a system comprising a merchant, a customer, and a check processor. The merchant 102 provides a shopping service to a customer 104. In one embodiment, the merchant 102 operates a shopping web site. In another embodiment, the merchant 102 operates a telephone service where a customer 104 can purchase items using automated menu selection, by pressing touch-tone keys or speaking voice commands that correspond to certain menu selections. In yet another embodiment, the merchant 102 provides human telephone operators, who receive purchasing orders from a customer 104 over a telephone. In addition to offering items for sale, the merchant 102 can be an organization that provides a service to the customer 104, for example a financial institution that allows the customer 104 to pay a past debt. One embodiment of a merchant's computer includes a data validation module 122, to be described below.

The customer 104 contacts the merchant 102 over a communication medium 106. In one embodiment, the communications medium 106 is a computer network such as the Internet. In another embodiment, the communications medium 106 is a wired or wireless telephone network. In other embodiments, the communications medium 106 can be any communication system including by way of example, two-way cable systems, interactive kiosk networks, automatic teller machine networks, interactive television networks, and the like.

In one embodiment, the customer 104 uses a computer to enter a shopping web site operated by the merchant 102. In other embodiments, the customer 104 talks over a telephone line with a human operator of the merchant 102 to make purchases, or makes purchases using automated menu selection by telephone. One embodiment of a customer's computer includes a data validation module 124, to be described below. The customer's computer is a communication device that allows for shopping over distance. It can be for example, a desktop computer, a laptop computer, a personal digital assistant, a network appliance, an interactive television, a wired or wireless telephone, a kiosk, a point of sale device, or the like.

The customer 104 communicates over the communication medium 106 with the merchant's computer. The merchant's computer is a device of the merchant 102 that interacts with or provides data to the customer's computer, including by way of example, any Internet site, private networks, network servers, video delivery systems, audio-visual media providers, television programming providers, telephone switching networks, teller networks, wireless communication centers, and the like.

The customer's computer and the merchant's computer may include, by way of example, processors, program logic, or other substrate configurations representing data and instructions, which operate as described herein. In other embodiments, the processors can comprise controller circuitry, processor circuitry, processors, general purpose single-chip or multi-chip microprocessors, digital signal processors, embedded microprocessors, microcontrollers, and the like.

The customer 104 selects one or more items to be purchased, and "writes a check" to pay for the purchase by submitting a check identifier along with the check amount to cover the purchase. For example, the customer 104 enters the check identifier at the merchant web site, speaks the check identifier to the merchant's telephone operator or to the merchant's telephone voice recognition device, or enters the check identifier from a telephone using the touch-tone keys.

The merchant 102 transmits the check identifiers entered by customers to a check processor 108 for processing. The check amount corresponding to each check identifier is also transmitted. The check processor 108 keeps a record of the transmitted check identifiers, and determines whether a transmitted check identifier should be authenticated as a valid check. For each authenticated check, the check processor 108 creates an electronic check record. In another embodiment, the customer 104 directly transmits a check identifier to the check processor 108. The check processor 108 authenticates the check and informs the merchant 102 that the customer's check has been authenticated.

The check processor 108 communicates with the merchant bank 110, the check clearing house 112, and the customer bank 114 to move funds among the proper accounts according to the created electronic check records. For example, in one embodiment, the check processor 108 forwards the record of an electronic check to the merchant bank 110, which is the bank used by the merchant 102. The merchant bank 110 posts the electronic check to the merchant's deposit account, and forwards the electronic check to the check clearing house 112. A popular check clearing house is the National Automated Clearing House Association of Washington D.C. The check clearing house 112 transmits information about the check to a Federal Reserve Bank (not shown). The Federal Reserve Bank transmits information about the check to the customer bank 114, which is the bank used by the customer 104. The customer bank 114 deducts the check amount from the customer's checking account. In one embodiment, the check processor 108 sends authenticated electronic check records to its bank, which communicates with the merchant bank 110, the check clearing house 112, and the customer bank 114 to credit the merchant's account at the merchant bank 110 and to debit the customer's account at the customer bank 114.

In one embodiment, the merchant 102 directly contacts the merchant bank 110 to credit the merchant's account. The merchant bank 110 then contacts the check clearing house 112, which contacts a Federal Reserve Bank. The customer bank 114, after being contacted by the Federal Reserve Bank, debits the customer's checking account.

In one embodiment, the check processor 108 includes a data validation module 126, an account database 128, and a symbol processing module 130. The data validation module 126 compares a check identifier received from the merchant 102 against records stored in the account database 128, to reduce the possibility of incorrect check identifier entries. Data validation can also be performed by a data validation module 124 at the customer's computer, or by a data validation module 122 at the merchant's computer.

The symbol processing module 130 instructs a user to replace separator symbols on an original check identifier with replacement symbols, and parses the substitute check identifier with replacement symbols to identify the fields of the routing number, the account number and the check number. Symbol processing can also be performed by a symbol processing module located at the customer's computer or at the merchant's computer.

In one embodiment, a check identifier is parsed by the symbol processing module 130, then validated by the data validation module 126. In another embodiment, a check identifier is validated by the data validation module 126, then parsed by the symbol processing module 130. The systems and methods of data validation and symbol processing are described below in detail.

The account database 128 stores records of checking account numbers and their corresponding routing numbers. In one embodiment, the account database stores records processed by the check processor 108. In another embodiment, the account database stores records processed by the merchant 102. In yet another embodiment, the account database is a shared database storing records processed by a number of merchants, check processors, and/or financial institutions. The account database can be located on a computer of the check processor 108, on a computer of the merchant 102, or on a computer accessible by a number of organizations.

Check Identifier Formats

Figure 2:
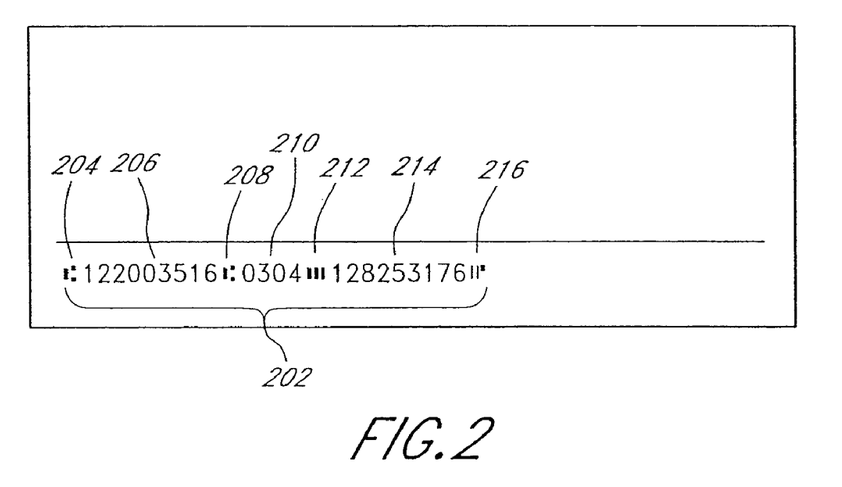
FIG. 2 shows one embodiment of a check identifier.

FIG. 2 shows one embodiment of a check identifier wherein the check identifier 202 is in a MICR (magnetic ink character recognition) format. The MICR format often comprises a first separator symbol 204, a routing number 206, a second separator symbol 208, a check number 210, a third separator symbol 212, an account number 214, and a fourth separator symbol 216. The separator symbols are placed to separate one field from another field within the check identifier 202. For example, in the embodiment shown in FIG. 2, the third separator symbol 212 separates the check number 210 from the account number 214.

The check identifier 202 in a MICR format typically includes the routing number 206 of the financial institution that issues the check, the account number 214 of the check writer, and the check number 210. The routing number 206 is a number that identifies the financial institution. The account number 214 is a number that identifies the account from which the check is drawn. The length of the account number field 214 varies among the financial institutions that issue the checks. The check number 210 is a number that identifies the check sequence within the account. The length of the check number field 210 varies among the financial institutions. The different fields, such as the routing number 206, the account number 214, and the check number 210 are separated by separator symbols such as 204, 208, 212, 216, and the like.

Financial institutions currently use a variety of MICR formats. For example, in the United States, many financial institutions rely on the ANSI standards X9.27-1988 and X9.13-1990, which are published by the American National Standards Institute, which are hereby incorporated herein by reference. The Federal Reserve is also considering adopting a uniform MICR format under the ANSI standard ASC 9.37. Furthermore, within the United States, the order of the fields within the MICR format can vary such as by way of example, the routing number 206, the account number 214 and the check number 210 may appear in different orders. Also, in other countries the MICR format can vary, such as, by way of example, variations in the size of the fields and variations in the arrangement of the fields can exist.

Figure 3:
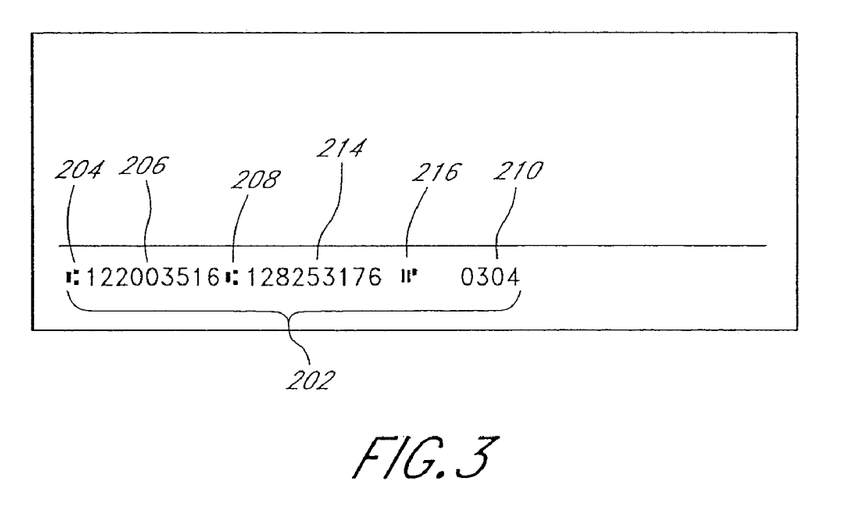
FIG. 3 shows another embodiment of a check identifier.

FIG. 3 shows another embodiment of a check identifier. Referring to FIG. 3, the check identifier 202 includes a first separator symbol 204, a routing number 206, a second separator symbol 208, an account number 214, a third separator symbol 212, and a check number 210. The fields in the check identifier may appear in other orders not shown in FIG. 2 or FIG. 3. For example, in one embodiment, the check number 210 may appear as the first field in the check identifier 202, followed by the routing number 206 and the account number 214.

Replacement Symbols

Figure 4:
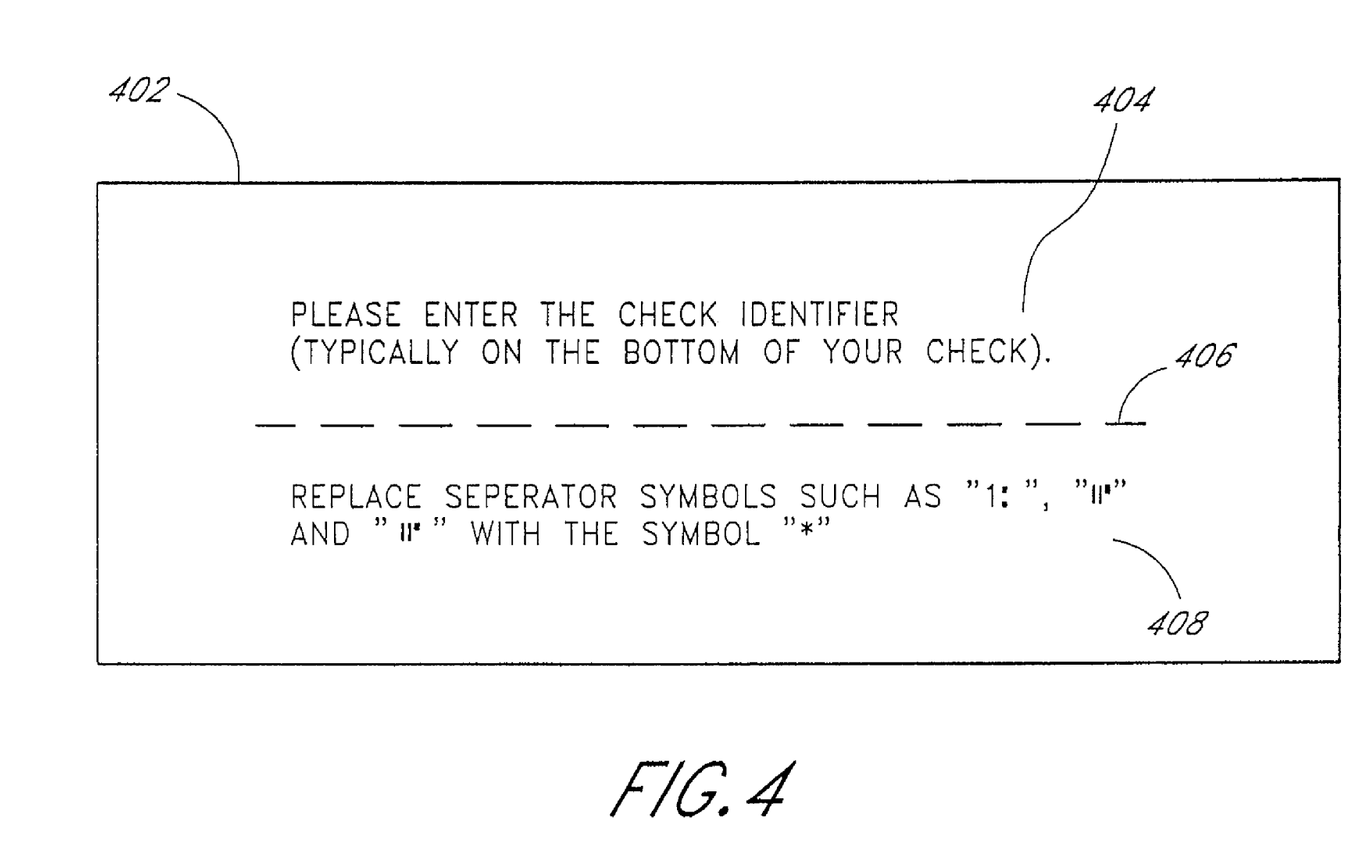
FIG. 4 shows one embodiment of a computer screen for entering a check identifier.

FIG. 4 shows one embodiment of a computer screen for entering a check identifier. In one embodiment, the area 402 is shown to an on-line customer on the customer's computer screen. In another embodiment, the area 402 is shown to a merchant's telephone operator who receives purchase requests and check identifier information from a customer 104 over a telephone. The area 402 can be shown on a computer screen of the telephone operator or on a piece of paper located close to the operator. In yet another embodiment, the instructions shown in area 402 is read to a customer who orders purchases from a telephone using automated menu selection.

In the embodiment shown in FIG. 4, the area 402 includes a first instruction 404, an entry field 406, and a second instruction 408. The first instruction 404 asks the customer or operator to enter the check identifier, which is typically printed on the bottom of a paper check. The entry field 406 is an empty field that allows input. The entry field is unfixed in length, because check identifiers can appear in various MICR formats and typically vary from approximately 20 to 30 digits in length. In one embodiment described below in connection with FIG. 5, the user is also prompted to enter the check number 210 again on a separate entry field.

Referring back to FIG. 4, the second instruction 408 reminds the customer 104 or operator to replace the separator symbols in the MICR format check identifier with a replacement symbol "*". Other symbols that appear on a common computer keyboard, such as ".", ",", "#", "/" and others may also be used as a replacement symbol.

For example, following the instructions shown in FIG. 4 and using the original check identifier shown in FIG. 2, a customer or operator will enter into the entry field 406 the following substitute check identifier: "*122003616*0304*128253276*". A customer or operator may also consider each separator symbol shown in FIG. 2 as two characters, and thus enter the following substitute check identifier: "1220036160304128253276". As described below in connection with FIG. 5, both entries are acceptable. A user entry that omits the beginning or ending separator symbols, such as "122003616*0304*128253276*", "*1122003616*0304*128253276", or "122003616*0304*128253276" is also acceptable, because it contains enough symbols to distinguish the fields within the check identifier.

Using Replacement Symbols

Figure 5:
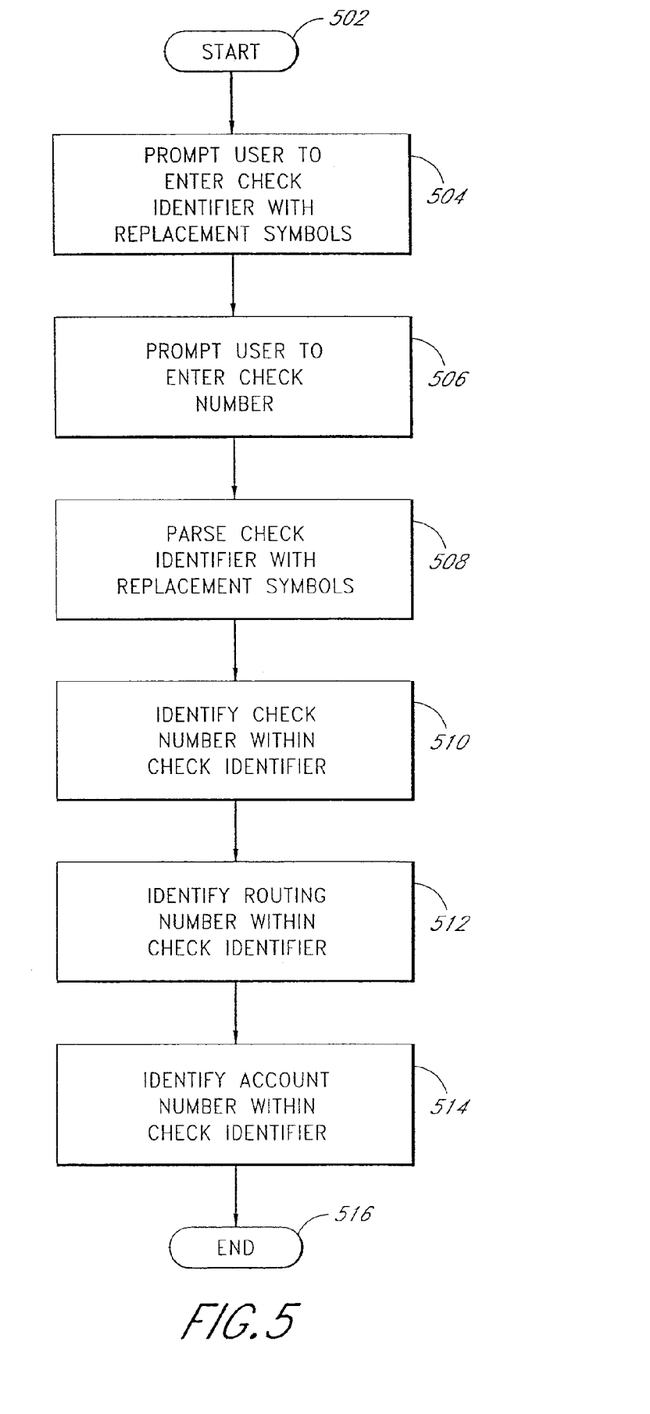
FIG. 5 shows one embodiment of a process of entering, receiving, and parsing a check identifier.

FIG. 5 shows one embodiment of a process of entering, receiving, and parsing a check identifier. A start block 502 proceeds to a block 504, where a user is asked by the symbol processing module to enter a substitute check identifier with replacement symbols. The symbol processing module can be placed in a computer of the check processor 108, in a computer of the merchant 102, or in a computer of the customer 104. The symbol processing module can also be a set of business rules not embodied in a computer program. A message such as shown in FIG. 4 is preferably presented by the symbol processing module to the user. The substitute check identifier replaces the separator symbols of an original check identifier such as shown in FIG. 2 or FIG. 3 with replacement symbols.

In one embodiment, the symbol processing module verifies that the user-entered substitute check identifier includes replacement symbols. In the event a user has only entered the numeric digits of a check identifier without entering any symbols to separate the fields, the symbol processing module asks the user to reenter a substitute check identifier including replacement symbols. In one implementation, the symbol processing module verifies that the user-entered substitute check identifier includes a pre-determined number of replacement symbols. For example, the symbol processing module verifies that user-entered substitute check identifier includes at least two and no more than four replacement symbols.

The block 504 proceeds to a block 506, where the user is prompted by the symbol processing module to enter the check number 210 of the check identifier 202. Although the user may have difficulty distinguishing the routing number 206 from the account number 214 within a check identifier 202, the user can typically identify the check number 210. This is because the check number 210 is typically prominently displayed on a paper check, for example at the right side top portion of the check. The check number 210 is typically fairly short in length, such as three to five digits. As described below, asking the user to identify the check number 210 improves the ease and accuracy of parsing the check identifier 202 entered by the user. In another embodiment, the user is not asked to enter the check number 210 separately, and the block 506 is omitted.

The block 506 proceeds to a block 508, where the symbol processing module parses the check identifier with replacement symbols entered by the user at the block 504, in order to distinguish the separate fields such as the routing number 206, the account number 214, and the check number 210 within the entered check identifier. The symbol processing module searches for the replacement symbols within the entered check identifier, and recognizes the digits between replacement symbols as one field. Consecutive replacement symbols such as "**" are recognized as a single replacement symbol "*".

In one embodiment, if the user has failed to enter a replacement symbol between two fields, or mistakenly entered a replacement symbol within a field, the symbol processing module still attempts to distinguish the fields. In one embodiment, the symbol processing module preliminarily distinguishes the fields based on the replacement symbols in the entered check identifier, then validates that the fields have been correctly distinguished. For example, for many transactions within the United States, the symbol processing module confirms that at least one of the distinguished fields is nine digits in length and is not the right most field in the check identifier. This is based on the observation that in the United States, the routing number 206 is often nine digits in length, and is generally not the right most field in a MICR format check identifier. In another embodiment, the symbol processing module confirms that at least one of the distinguished fields is a predetermined number of digits in length based on various international and foreign country formats. The symbol processing module can also confirm that there are different distinguished fields.

In another embodiment, the symbol processing determines if the left most digits of the entered check identifier correspond to the check number 210 entered at the block 506. The replacement symbols within the entered check identifier are disregarded as digits. If the determination is positive, then these left most digits are identified as the check number field 210, and the next digits in the entered check identifier are identified as the routing number field 206, with the rest of the digits identified as the account number field 214. If the determination is negative, then the left most nine digits are identified as the routing number field 206. Therefore, fields within the check identifier may still be distinguished and identified, even if replacement symbols are omitted or misplaced.

The block 508 proceeds to a block 510, where the symbol processing module identifies the check number 210 within the entered check identifier. In one embodiment, based on the separate fields recognized at the block 508, the symbol processing module looks for the field within the entered check identifier that is identical to the check number 210 entered by the user at the block 506 or identical to the check number 210 entered at the block 506, possibly preceded by one or more numerical symbols of "0". Such a field is identified as the check number field 210 within the entered check identifier. In another embodiment, if three fields have been distinguished at the block 508, then the field with the shortest length is identified as the check number field 210.

The block 510 proceeds to a block 512, where the symbol processing module identifies the routing number 206 within the entered check identifier. In one embodiment associated with transactions in the United States, the symbol processing module identifies the routing number 206 by searching for the left most nine-digit field within the entered check identifier. According to existing MICR format standards in the United States, the routing number 206 appears to the left of the account number 214. In one embodiment, the symbol processing module performs a check-digit algorithm validation on the left most nine-digit field, to ensure that it is the routing number field 206. In another embodiment, the symbol processing module uses the nine-digit field within the entered check identifier to search for an identical record in a routing number database of routing numbers 206 issued to financial institutions. If such a record is found, then the field is identified as the routing number field 206. In another embodiment, the symbol processing module processes the remaining fields of the entered check identifier by searching for a predetermined number of digits within a field in order to identify the routing number. The predetermined number of digits can vary based on different routing number formats such as by way of example, the different routing numbers used by banks in foreign countries.

The block 512 proceeds to a block 514, where the symbol processing module identifies the remaining unidentified field as the account number field 214. The block 514 then proceeds to an end block 516, where the check identified with the identified routing number 206, account number 214, and check number 210 is used for further processing. For example, the check processor 108 creates an electronic check record based on the routing number 206, account number 214, and check number 210, and sends the record to financial institutions to credit the merchant's account and to debit the customer's account. The check processor 108 can conduct further risk analysis before authenticating the check identifier and creating an electronic check record.

Other embodiments of symbol processing can also be employed. For example, in one embodiment, after parsing the entered check identifier to distinguish separate fields, the symbol processing module looks for the left most field within the entered check identifier with the appropriate number of digits. Such a field is identified as the routing number field 206. Additionally, a check-digit algorithm validation or a routing number database search can be conducted before identifying the field as the routing number field 206. Of the remaining fields, the field of greater length is identified as the account number field 214, the field of shorter length is identified as the check number field 210.

Figure 6:
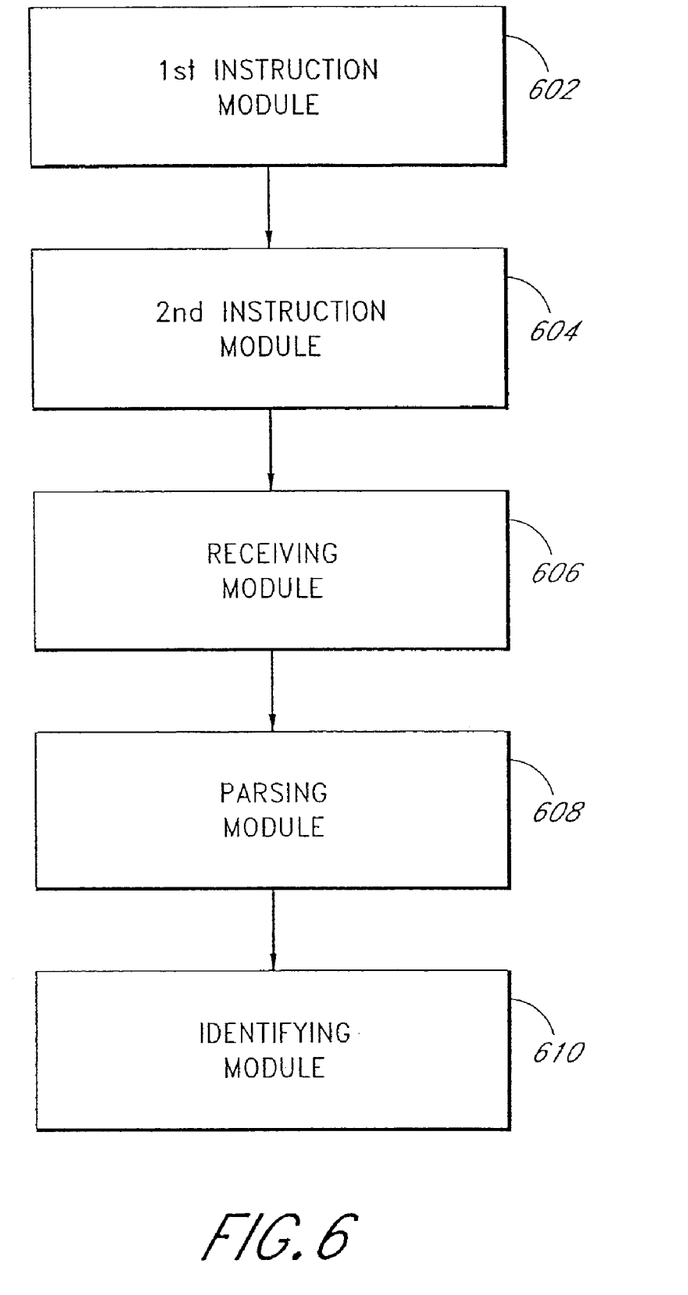
FIG. 6 shows one embodiment of a system for entering, receiving, and parsing a check identifier.

FIG. 6 shows one embodiment of a system for entering, receiving, and parsing a check identifier. In the embodiment shown in FIG. 6, the system includes a first instruction module 602, a second instruction module 604, a receiving module 606, a parsing module 608, and an identifying module 610. The first instruction module 602 instructs a user to replace the separator symbols within an original MICR format check identifier with replacement symbols. The replacement symbols are preferably pre-determined symbols that appear on common computer keyboards or common touch-tone telephone keypads. After the separator symbols are replaced, the resulting check identifier with replacement symbols is referred to as a substitute check identifier. The second instruction module 604 instructs the user to enter the substitute check identifier with the replacement symbols into a computer system or into a telephone system.

The receiving module 606 receives the user-entered substitute check identifier. The parsing module 608 parses the received substitute check identifier and distinguishes the separate fields within the substitute check identifier, using the replacement symbols as indications of where one field ends and another field begins within the substitute check identifier. The identifying module 610 identifies the routing number 206, the account number 214, and the check number 210 of the substitute check identifier within the distinguished fields. For example, in one embodiment, the identifying module 610 identifies the nine-digit field that appears to the left most of the substitute check identifier as the routing number 206. Of the remaining distinguished fields, the field with the greater length is identified as the account number 214, the field with the shorter length is identified as the check number 210.

Double Entry

The paragraphs below describe in detail certain embodiments of the double entry systems and methods. The double entry systems and methods can be used in conjunction with the above-described replacement symbol systems and methods. For example, a user enters a substitute check identifier with replacement symbols. If the substitute check identifier does not relate to any stored record in a database, the user is asked to enter the substitute check identifier for a second time.

The double entry systems and methods and the replacement symbol systems and methods can also be utilized independently. For example, a user enters an original MICR format check identifier with the separator symbols (for instance using a special input system that allows input of separator symbols), and is asked to re-enter the original MICR format check identifier if a related record is not found in a database. In another example, a user enters a check identifier without any separator symbols or replacement symbols, and is asked for a re-entry if a related record is not found in a database. In yet another example, a user enters a substitute check identifier with replacement symbols. The entry is accepted without searching for a related record in a database or asking for a second entry.

Figure 7:
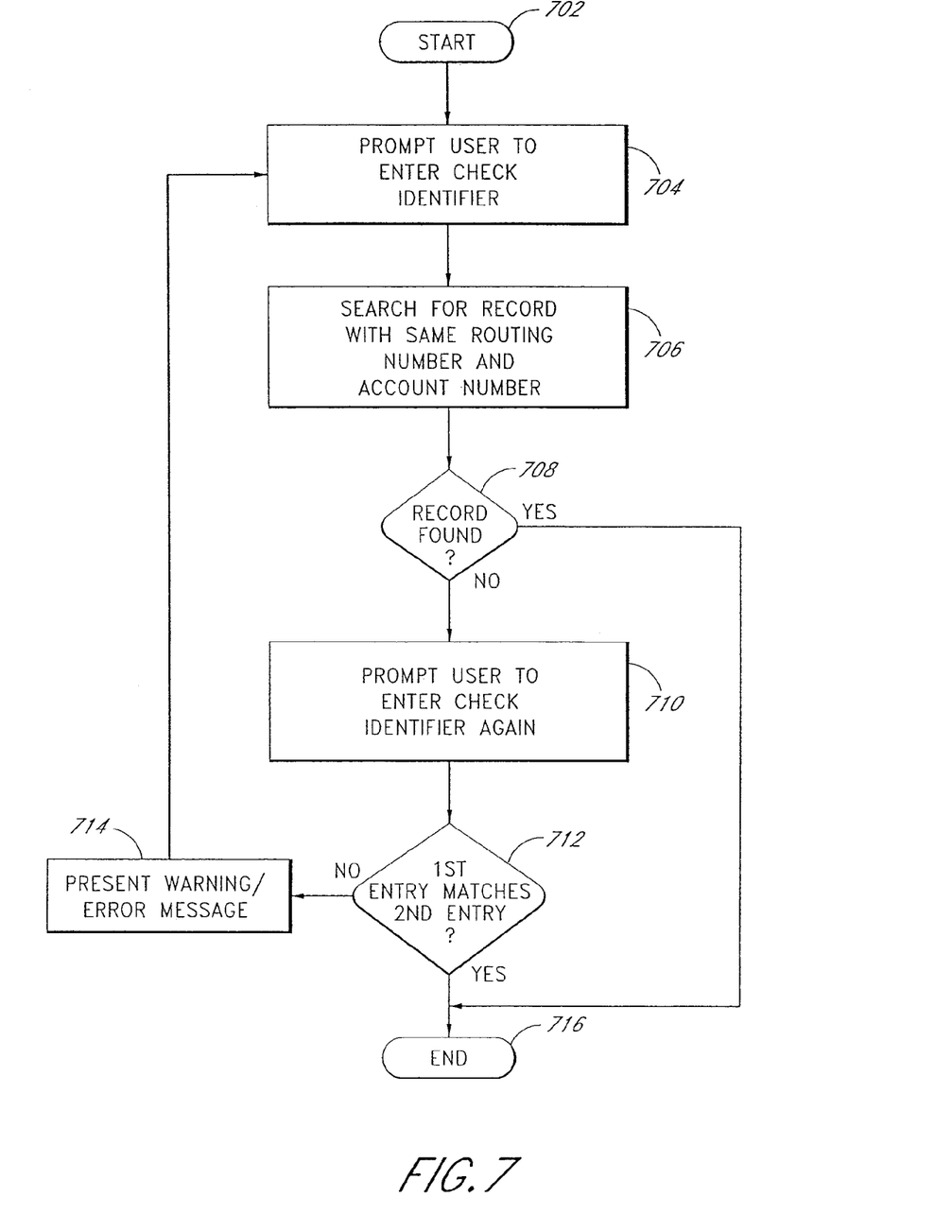
FIG. 7 shows one embodiment of a process of entering and receiving a check identifier.

FIG. 7 shows one embodiment of a process of entering and receiving a check identifier. As shown in FIG. 7, a start block 702 proceeds to a block 704. At the block 704, the data validation module prompts the user to enter a check identifier. The user can be, for example, a customer 104 who orders purchases from a computer or a telephone, or a telephone operator of the merchant 102. In one embodiment, the user is prompted to use replacement symbols to replace the separator symbols in an original check identifier of MICR format. In another embodiment, the user is prompted to enter the fields of a check identifier without entering any symbols.

In one embodiment described above in connection with FIG. 5, in addition to entering the check identifier, the user is also prompted to enter the check number 210 separately. After the entered check identifier is parsed and the check number field 210 is identified, the identified check number field 210 and the separately entered check number 210 are compared to ensure that they have been entered correctly.

The block 704 proceeds to a block 706. At the block 706, the data validation module uses the entered check identifier to search for account records stored in the account database 128 that have the same routing number 206 and account number 214 as the entered check identifier. In one embodiment, the routing number 206 and account number 214 within the entered check identifier are identified using the process of FIG. 5. As described above in connection with FIG. 1, the data validation module can be placed in a computer of the check processor 108, in a computer of the merchant 102, or in a computer of the customer 104. The data validation module can also be a set of business rules not embodied in a computer program.

Referring back to FIG. 7, the block 706 proceeds to a block 708. At the block 708, the data validation module determines whether an account record is found in the account database 128 that matches the routing number 206 and account number 214 of the entered check identifier. If a record is found, the entered check identifier is accepted as a correct entry, and the block 708 proceeds to an end block 716. The end block 716 proceeds to further processing, for example, accepting the entered check identifier when the found record indicates that the routing number 206 and account number 214 had been used for purchases before, and had no history of overdraft or fraud. The end block 716 may also proceed to further risk analysis based on the previous transaction history of the routing number 206 and account number 214. The end block 716 may also proceed to reject the entered check identifier, if the found record indicates that the routing number 206 and account number 214 had a history of overdraft or fraud. In one embodiment, the data validation module also searches the account database and 128 determines if the entered check identifier including the check number 210 has been used in a previous purchase. If the routing number 206, account number 214 and check number 210 has been used before, the check identifier is rejected.

At the block 708, if no account record matches the routing number 206 and account number 214 of the entered check identifier, then the entered check identifier indicates a potential new account record. The data validation module proceeds to a block 710, and prompts the user to enter the check identifier again. In one embodiment, a message such as "your check identifier indicates a new account to us, therefore please enter it again to ensure accuracy" is preferably presented to the user, so that the user is not upset about having to enter twice. In one embodiment, in which the user enters the check identifier on a computer, the second entry starts on a separate screen, so that the user cannot type in the second entry by reading the previous entry on the same screen. The user is also prevented from returning to the screen of the previous entry to read or to copy and paste the previous entry. In another embodiment, when the user is prompted to enter the second entry, the previous entry of the check identifier is replaced with blank spaces, to prevent the user from reading the first entry.

In one embodiment of making the second entry, the user is prompted to enter only a portion of the check identifier again. For example, the user is prompted to enter the first nine digits of the check identifier again. Requiring the user to re-enter only a portion of the check identifier may reduce user processing time. However, if the portion of the check identifier is entered correctly at the block 704 and the block 710, but another portion of the check identifier is entered incorrectly at the block 704, then the incorrectly entered check identifier may be accepted as a correct entry.

After the user has entered a second entry of the check identifier, the block 710 proceeds to a block 712. At the block 712, the data validation module determines whether the first entry matches the second entry. In the embodiment where the user is prompted to enter only a portion of the check identifier during the second entry, the data validation module determines whether the second entry matches the corresponding portion of the first entry. If the two entries match, then the block 712 proceeds to the end block 716 for further processing, such as further risk analysis or authenticating the entered check identifier.

At the block 712, if the two entries do not match, then the block 712 proceeds to a block 714, where the data validation module presents a warning or error message to the user. The message may be presented on the user's computer screen or over the telephone to the user. The user is informed that the two entries of the check identifier do not match, and is asked to enter the check identifier two more times. The block 714 then returns to the block 704. In another embodiment, the block 714 returns to the block 710 so that the user is asked to enter the check identifier one more time. The data validation module then compares the latest entry with the first entry of check identifier. In one embodiment, the user is rejected after a certain number of failed attempts, and the check identifier entries made by the rejected user are recorded as high-risk, fraudulent, or stolen numbers.

Figure 8:
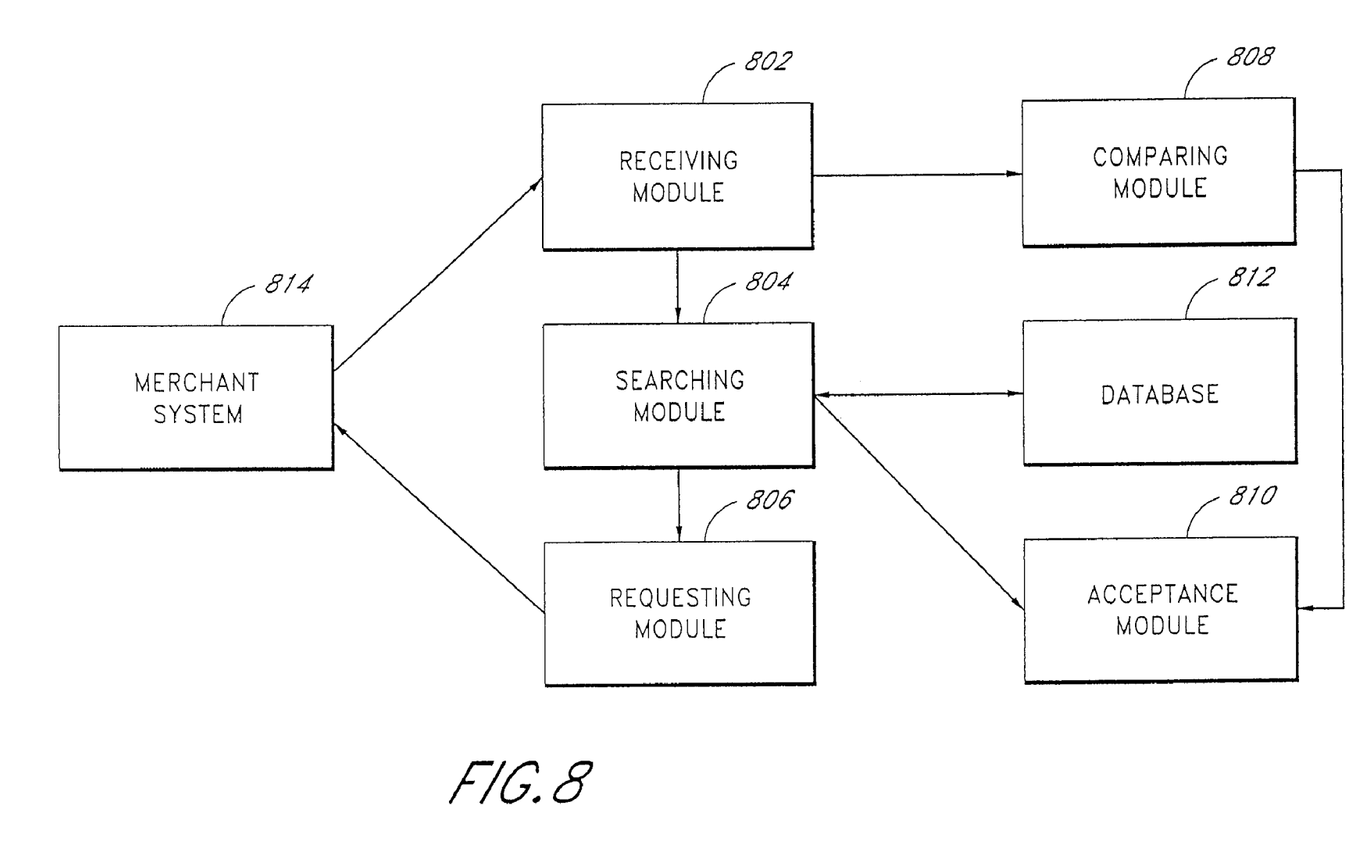
FIG. 8 shows one embodiment of a system for entering and receiving a check identifier.

FIG. 8 shows one embodiment of a system for entering and receiving a check identifier. The system as shown in FIG. 8 includes a receiving module 802, a searching module 804, a requesting module 806, a comparing module 808, and an acceptance module 810. In one embodiment, the modules 802, 804, 806, 808 and 810 are located on a system of the check processor 108. The receiving module 802 receives a first user-entered check identifier from the merchant system 814. In one embodiment, the merchant system 814 is the merchant 102 as shown in FIG. 1.

Referring back to FIG. 8, the searching module 804 searches in a database 812 for records that relate to the first check identifier received by the receiving module 802. The database 812 is connected to the searching module 804. In one embodiment, the database 812 is the account database 128 as shown in FIG. 1. If the searching module 804 finds a record in the database 812 that relates to the first check identifier, for example if the routing number 206 and account number 214 of a checking account record stored in the database 812 match the routing number 206 and account number 214 of the first user-entered check identifier, then the acceptance module 810 accepts the first user-entered check identifier as a correct entry.

If the searching module 804 cannot find a record in the database 812 that relates to the first check identifier, then the requesting module 806 transmits a request to the merchant system 814 for reentry of a second check identifier. In one embodiment, a single module performs the functions of both the receiving module 802 and the requesting module 806. After the receiving module 802 receives the second check identifier entered by the user, the comparing module 808 compares the first and second check identifiers. If the two entries are consistent, then the acceptance module 810 accepts the user-entered first check identifier as a correct entry.

Although certain passages above have described entering check identifiers from a computer or telephone in the course of shopping over a distance, the methods and systems of using replacement symbols and requiring double entries can be applied to other situations as well. For instance, where an operator of a merchant, financial institution or third party organization is entering check identifiers into a computer system based on reading paper checks, reading scanned images of paper checks or faxed copies of paper checks, the operator can use replacement symbols to replace the separator symbols. The operator can also be required to enter twice those check identifiers that do not match stored records.

While certain embodiments of the inventions have been described, these embodiments have been presented by way of example only, and are not intended to limit the scope of the inventions. Indeed, the novel methods and systems described herein may be embodied in a variety of other forms without departing from the spirit thereof. The accompanying claims and their equivalents are intended to cover such forms or modifications as would fall within the scope and spirit of the inventions.

What is claimed is:

1. A system for processing a substitute check identifier in a check transaction wherein a MICR line associated with the check transaction comprises a plurality of MICR numeric fields separated by at least one non-numeric MICR separator symbol, the system comprising:
   a parsing module residing on computer-readable media, the parsing module comprising computer code configured to distinguish at least one field within the substitute check identifier;
   wherein the substitute check identifier comprises at least one replacement non-numeric symbol that replaces and is different from the at least one non-numeric MICR separator symbol in the MICR line; and
   wherein the substitute check identifier further comprises a plurality of numeric fields; and
   a validation module configured to validate the substitute check identifier by determining whether a predetermined number of replacement non-numeric symbols exists in the substitute check identifier, and further determining whether at least one of the numbers in the plurality of numeric fields associated with the substitute check identifier comprises a predetermined number of digits for the at least one number; and
   if a replacement non-numeric symbol is mistakenly entered by a user within the plurality of numeric fields associated with the substitute check identifier, the validation module is further configured distinguish between the plurality of numeric fields associated with the substitute check identifier by determining whether an identified check number corresponds with a previously entered check number.

2. The system of claim 1, wherein the parsing module is further configured to identify a routing number field.

3. The system of claim 1, wherein the parsing module is further configured to identify an account number field.

4. The system of claim 1, wherein the parsing module is further configured to identify a check number field.

5. The system of claim 1, wherein the substitute check identifier comprises at least one of a routing number field, an account number field, and a check number field.

6. The system of claim 5, wherein the replacement non-numeric symbol exists between the account number field and the check number field.

7. The system of claim 5, wherein the replacement non-numeric symbol exists between the account number field and the routing number field.

8. The system of claim 5, wherein the replacement non-numeric symbol exists at the beginning of the substitute check identifier.

9. The system of claim 1, wherein the replacement non-numeric symbol is a generic symbol.

10. A method of processing a substitute check identifier in a check transaction wherein a MICR line associated with the check transaction comprises a plurality of MICR numeric fields separated by at least one non-numeric MICR separator symbol, the method comprising:
- identifying at least one non-numeric replacement symbol within a substitute check identifier,
- wherein the substitute check identifier comprises at least one replacement non-numeric symbol that replaces and is different from the at least one non-numeric MICR separator symbol in the MICR line, and wherein the substitute check identifier further comprises a plurality of numeric fields;
- distinguishing at least one field within the substitute check identifier using the identified at least one non-numeric replacement symbol to produce a parsed check identifier;
- identifying a check number in the parsed check identifier;
- identifying a routing number in the parsed check identifier;
- identifying an account number in the parsed check identifier;
- validating the parsed check identifier by determining whether a predetermined number of replacement non-numeric symbols exists in the substitute check identifier, and further determining whether at least one of the numbers in the substitute check identifier comprises a predetermined number digits for the at least one number; and
- if a replacement non-numeric symbol is mistakenly entered by a user within at least one field associated with the substitute check identifier, distinguishing between the fields associated with the substitute check identifier by determining whether an identified check number corresponds with a previously entered check number.

11. The method of claim 10, wherein the replacement non-numeric symbol is a symbol from a computer keyboard.

12. The method of claim 10, wherein the replacement non-numeric symbol is a symbol from a telephone keypad.

13. The method of claim 10, wherein the replacement non-numeric symbol is an asterisk.

14. The method of claim 10, wherein the replacement non-numeric symbol is a "#" symbol.

15. The method of claim 10, wherein the replacement non-numeric symbol is a generic symbol.

16. A computer program stored on a computer-readable medium and configured for processing a substitute check identifier in a check transaction wherein a MICR line associated with the check transaction comprises a plurality of MICR numeric fields separated by at least one non-numeric MICR separator symbol, the computer program comprising:
- computer code configured to identify at least one non-numeric replacement symbol within the substitute check identifier, wherein the substitute check identifier comprises at least one non-numeric replacement symbol that replaces the at least one original non-numeric separator symbol in the MICR line, and wherein the substitute check identifier further comprises a plurality of numeric fields separated by the at least one non-numeric replacement symbol;
- computer code configured to distinguish at least one field within the substitute check identifier using the identified at least one non-numeric replacement symbol to produce a parsed check identifier;
- computer code configured to identify a check number in the parsed check identifier;
- computer code configured to identify a routing number in the parsed check identifier; and
- computer code configured to identify an account number in the parsed check identifier;
- computer code configured to validate the parsed check identifier by determining whether a predetermined number of replacement non-numeric symbols exists in the substitute check identifier, and further determining whether at least one of the numbers in the substitute check identifier comprises a predetermined number digits for the at least one number; and
- computer code configured to distinguish between the numeric fields associated with the substitute check identifier by determining whether an identified check number corresponds with a previously entered check number if a replacement non-numeric symbol is mistakenly entered by a user within at least one numeric field associated with the substitute check identifier.

17. The computer program of claim 16, wherein the replacement non-numeric symbol is a symbol from a computer keyboard.

18. The computer program of claim 16, wherein the replacement non-numeric symbol is a symbol from a telephone keypad.

19. The computer program of claim 16, wherein the replacement non-numeric symbol is an asterisk.

20. The computer program of claim 16, wherein the replacement non-numeric symbol is a "#" symbol.

* * * * *